US012183480B2

(12) United States Patent
Iwakura

(10) Patent No.: US 12,183,480 B2
(45) Date of Patent: Dec. 31, 2024

(54) CONDUCTIVE CONNECTING MEMBER

(71) Applicant: SUMITOMO WIRING SYSTEMS, LTD., Mie (JP)

(72) Inventor: Eisaku Iwakura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 86 days.

(21) Appl. No.: 17/729,203

(22) Filed: Apr. 26, 2022

(65) Prior Publication Data

US 2022/0344838 A1 Oct. 27, 2022

(30) Foreign Application Priority Data

Apr. 27, 2021 (JP) ................................. 2021-075175

(51) Int. Cl.
*H01B 5/12* (2006.01)
*H01R 11/12* (2006.01)

(52) U.S. Cl.
CPC ............... *H01B 5/12* (2013.01); *H01R 11/12* (2013.01)

(58) Field of Classification Search
None
See application file for complete search history.

(56) References Cited

U.S. PATENT DOCUMENTS 5,030,797 A * 7/1991 Logstrup .............. H01B 7/0018 439/502
5,541,380 A * 7/1996 Ogden ................... H01R 11/12 219/56.22
6,948,939 B1 * 9/2005 Kogan ................... H01R 35/04 174/93
9,455,068 B2 * 9/2016 Omoto ................... H01R 43/28
2019/0013609 A1 * 1/2019 Kimura .................. H01R 13/33

FOREIGN PATENT DOCUMENTS

JP 2008-041330 A 2/2008

* cited by examiner

*Primary Examiner* — Ross N Gushi
(74) *Attorney, Agent, or Firm* — Venjuris, P.C.

(57) ABSTRACT

A conductive connecting member includes a first terminal, a second terminal, and a braided member for electrically connecting the first and second terminals. The braided member is a member formed by braiding a plurality of metal strands each other. The braided member includes a first fixing portion to be fixed and electrically connected to the first terminal, a second fixing portion to be fixed and electrically connected to the second terminal and an intermediate portion serving as a part of the braided member between the first and second fixing portions. The intermediate portion retains its own shape in a natural state where no external force is applied and is deformed to allow a relative movement of the second terminal with respect to the first terminal when an external force for relatively changing a position of the second terminal with respect to the first terminal is applied.

10 Claims, 7 Drawing Sheets

CONDUCTIVE CONNECTING MEMBER

CROSS-REFERENCE TO RELATED APPLICATIONS

This application is based on and claims priority from Japanese Patent Application No. 2021-075175, filed on Apr. 27, 2021, with the Japan Patent Office, the disclosure of which is incorporated herein in its entirety by reference.

TECHNICAL FIELD

The present disclosure relates to a conductive connecting member.

BACKGROUND

Conventionally, some of conductive connecting members for electrically connecting two connection targets include a braided member in a vehicle such as an automotive vehicle. For example, a conductive connecting member described in Japanese Patent Laid-open Publication No. 2008-041330 includes a terminal to be electrically connected to one connection target, a terminal to be electrically connected to the other connection target and a plurality of braided members for electrically connecting these two terminals. Each braided member is a member formed by flatly braiding a plurality of metal strands. Further, each braided member is a flexible member having no shape retention force. The plurality of braided members are overlapped with width directions thereof coinciding. Further, both longitudinal end parts of each braided member are respectively electrically connected to the two terminals.

SUMMARY

In the conductive connecting member described in Japanese Patent Laid-open Publication No. 2008-041330, the position of the other terminal with respect to the one terminal can be easily changed by deforming each braided member. At this time, to sufficiently exhibit the flexibility of the braided members, the two terminals may be so arranged that at least one of the plurality of braided members is slackened. The braided member in a slackened state easily shakes. Therefore, when vibration is transmitted to the conductive connecting member, this braided member may shake to interfere with surrounding objects.

The present disclosure aims to provide a conductive connecting member capable of suppressing interference with surrounding objects.

A conductive connecting member of the present disclosure is a conductive connecting member for electrically connecting a first connection target and a second connection target and includes a first terminal to be electrically connected to the first connection target, a second terminal to be electrically connected to the second connection target, and a braided member for electrically connecting the first and second terminals, wherein the braided member is a member formed by braiding a plurality of metal strands each other and includes a first fixing portion to be fixed and electrically connected to the first terminal, a second fixing portion to be fixed and electrically connected to the second terminal and an intermediate portion serving as a part of the braided member between the first and second fixing portions, and the intermediate portion retains an own shape in a natural state where no external force is applied and is deformed to allow a relative movement of the second terminal with respect to the first terminal when an external force for relatively changing a position of the second terminal with respect to the first terminal is applied.

According to the conductive connecting member of the present disclosure, it is possible to suppress interference with surrounding objects.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
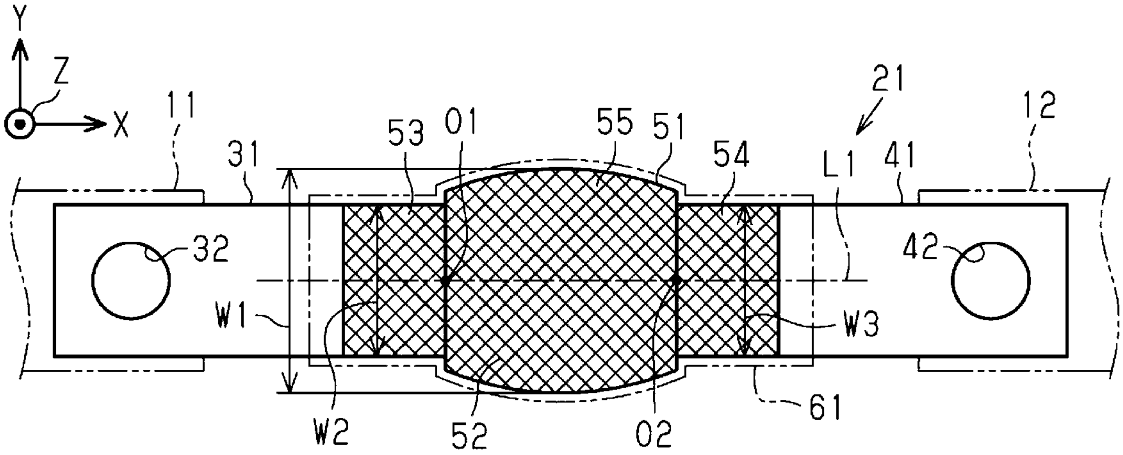
FIG. 1 is a front view of a conductive connecting member in one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

[1] The conductive connecting member of the present disclosure is a conductive connecting member for electrically connecting a first connection target and a second connection target and includes a first terminal to be electrically connected to the first connection target, a second terminal to be electrically connected to the second connection target, and a braided member for electrically connecting the first and second terminals, wherein the braided member is a member formed by braiding a plurality of metal strands each other and includes a first fixing portion to be fixed and electrically connected to the first terminal, a second fixing portion to be fixed and electrically connected to the second terminal and an intermediate portion serving as a part of the braided member between the first and second fixing portions, and the intermediate portion retains an own shape in a natural state where no external force is applied and is deformed to allow a relative movement of the second terminal with respect to the first terminal when an external force for relatively changing a position of the second terminal with respect to the first terminal is applied.

According to this configuration, the intermediate portion retains its own shape in the natural state where no external force is applied. Thus, it is suppressed that the braided member shakes between the first and second terminals. Therefore, the interference of the conductive connecting member with surrounding objects can be suppressed.

Further, in connecting the conductive connecting member to the first and second connection targets, at least either the first terminal and the first connection target or the second terminal and the second connection target may be shifted in position due to a dimensional error, an assembling error or the like. The intermediate portion is deformed to allow a relative movement of the second terminal with respect to the first terminal when an external force for relatively changing the position of the second terminal with respect to the first terminal is applied to the conductive connecting member. Thus, the positions of the first terminal and the first connection target and those of the second terminal and the second connection target can be respectively aligned by deforming the intermediate portion. Further, the intermediate portion is easily deformed since being a part of the braided member.

[2] Preferably, each of the plurality of metal strands is irregularly bent at least in the intermediate portion.

According to this configuration, the intermediate portion easily obtains rigidity for retaining its own shape in the natural state where no external force is applied to the conductive connecting member. On the other hand, the intermediate portion is easily deformed to allow a relative movement of the second terminal with respect to the first terminal when an external force for relatively changing the position of the second terminal with respect to the first terminal is applied to the conductive connecting member. Further, a degree of freedom in a relative moving direction of the second terminal with respect to the first terminal can be increased in the case of changing the relative position of the second terminal with respect to the first terminal by deforming the intermediate portion.

[3] Preferably, the first fixing portion is overlapped on the first terminal, and, if a straight line passing through a center of an end part of the first fixing portion adjacent to the intermediate portion and a center of an end part of the second fixing portion adjacent to the intermediate portion is assumed as a virtual line and an overlapping direction of the first fixing portion and the first terminal when viewed from a direction along the virtual line is assumed as a thickness direction, the virtual line penetrates through the intermediate portion, and a thickness of the intermediate portion in the thickness direction is larger than a thickness of the first fixing portion in the thickness direction and larger than a thickness of the second fixing portion in the thickness direction.

According to this configuration, the intermediate portion more easily retains its own shape in the natural state where no external force is applied as compared to the case where the thickness of the intermediate portion is equal to or smaller than the thickness of the first fixing portion and equal to or smaller than the thickness of the second fixing portion. Further, as compared to the above case, the intermediate portion is more easily deformed to allow a relative movement of the second terminal with respect to the first terminal when an external force for relatively changing the position of the second terminal with respect to the first terminal is applied to the conductive connecting member.

[4] Preferably, if a straight line passing through a center of an end part of the first fixing portion adjacent to the intermediate portion and a center of an end part of the second fixing portion adjacent to the intermediate portion is assumed as a virtual line, a cross-sectional shape of the intermediate portion cut along a plane perpendicular to the virtual line is a polygonal shape.

According to this configuration, since the cross-sectional shape of the intermediate portion cut along the plane perpendicular to the virtual line is a simple polygonal shape, the conductive connecting member can be easily manufactured.

[5] Preferably, an outer peripheral surface of the intermediate portion includes a flat surface portion in the form of a flat surface.

According to this configuration, the flat surface portion has a simple flat surface shape. Thus, the intermediate portion including the flat surface portion on the outer peripheral surface can be easily manufactured.

[6] Preferably, the plurality of metal strands are braided into a tube.

According to this configuration, the thickness of the intermediate portion can be easily increased as compared to the case where the metal strands are flatly braided.

[7] Preferably, the first terminal includes a first fastening hole into which a bolt for electrically connecting the first terminal to the first connection target is insertable, and the second terminal includes a second fastening hole into which a bolt for electrically connecting the second terminal to the second connection target is insertable.

According to this configuration, the conductive connecting member can be easily electrically connected to the first and second connection targets with the bolts, using the first and second fastening holes. Further, if the first terminal is electrically connected to the first connection target with the bolt, it can be suppressed that the electrical connection of the first terminal and the first connection target becomes unstable. Similarly, if the second terminal is electrically connected to the second connection target with the bolt, it can be suppressed that the electrical connection of the second terminal and the second connection target becomes unstable.

[8] Preferably, a heat shrinkage tube is provided which covers an outer periphery of the braided member.

According to this configuration, the braided member can be protected by the heat shrinkable tube. Further, distances between the braided member and surrounding objects can be further reduced with the conductive connecting member connected to the first and second connection targets.

Details of Embodiment of Present Disclosure

A specific example of a conductive connecting member of the present disclosure is described below with reference to the drawings. Note that the present disclosure is not limited to these illustrations and is intended to be represented by claims and include all changes in the scope of claims and in the meaning and scope of equivalents. Further, in the accompanying drawings, constituent elements may be shown in an enlarged manner to facilitate description. In the accompanying drawings, dimension ratios of the constituent elements may be different from actual ones or those in the other drawings.

Hereinafter, one embodiment of the conductive connecting member is described.

A conductive connecting member 21 shown in FIG. 1 is, for example, provided in an electric device installed in a vehicle such as an automotive vehicle. For example, the conductive connecting member 21 is provided in a wheel driving motor serving as a power source for the travel of a vehicle such as an electric or hybrid vehicle. Power is supplied to the motor from a battery capable of supplying a voltage of, for example, several tens to several hundreds of volts and a power supply source including an inverter circuit. The motor includes a conductive motor case. The conductive connecting member 21 is arranged inside the motor case.

Figure 2:
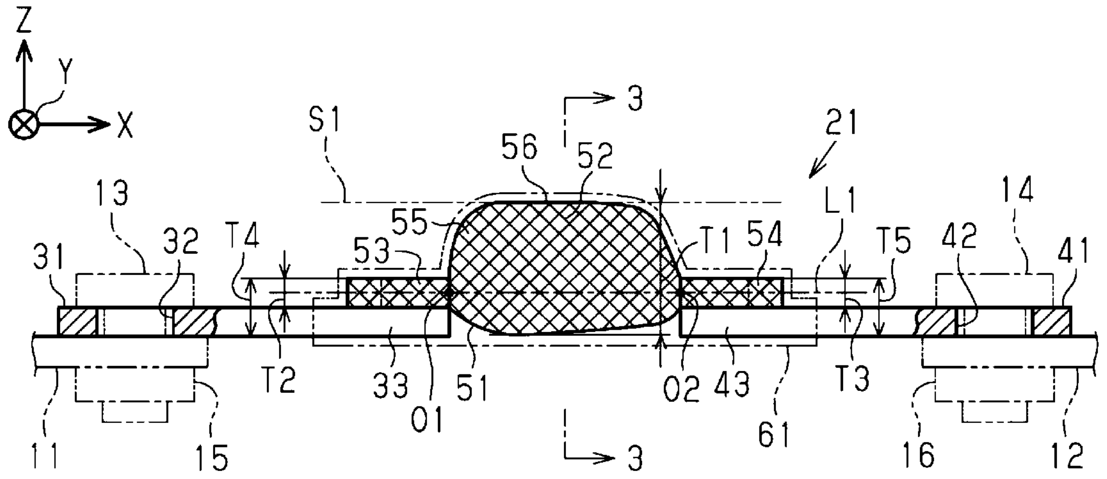
FIG. 2 is a side view of the conductive connecting member in the embodiment.

As shown in FIGS. 1 and 2, the conductive connecting member 21 is a member for electrically connecting a first connection target 11 and a second connection target 12. The first and second connection targets 11, 12 are, for example, components arranged inside the motor case together with the conductive connecting member 21. The conductive connecting member 21 includes a first terminal 31 to be electrically connected to the first connection target 11, a second terminal 41 to be electrically connected to the second connection target 12 and a braided member 51 for electrically connecting the first and second terminals 31, 41.

(First Terminal 31, Second Terminal 41)

The first and second terminals 31, 41 are made of a conductive material. The first and second terminals 31, 41 are, for example, made of any one of metal materials including copper, copper alloy, aluminum and aluminum alloy. Note that the first and second terminals 31, 41 may be made of a metal material other than copper, copper alloy, aluminum and aluminum alloy. The first and second terminals 31, 41 can have an arbitrary shape and are, for example, respectively plate-like.

As shown in FIG. 2, the first terminal 31 may include a first fastening hole 32 into which a bolt 13 for electrically connecting the first terminal 31 to the first connection target 11 is insertable. The second terminal 41 may include a second fastening hole 42 into which a bolt 14 for electrically connecting the second terminal 41 to the second connection target 12 is insertable. The first and second fastening holes 32, 42 are respectively through holes penetrating through the first and second terminals 31, 41.

The first terminal 31 includes, for example, a first connecting portion 33, to which the braided member 51 is electrically connected. The second terminal 41 includes, for example, a second connecting portion 43, to which the braided member 51 is electrically connected.

(Braided Member 51)

The braided member 51 is a member formed by braiding a plurality of metal strands 52 each other. Note that although the metal strands 52 are simplified and shown as a lattice in figures, the metal strands 52 are actually bent in a complicated manner. The plurality of metal strands 52 are, for example, braided into a tube.

The metal strands 52 are, for example, made of any one of metal materials including copper, copper alloy, aluminum and aluminum alloy. Note that the metal strands 52 may be made of a metal material other than copper, copper alloy, aluminum and aluminum alloy.

A diameter of the metal strand 52 is, for example, preferably 0.1 mm to 0.2 mm. For example, the diameter of the metal strand 52 is 0.12 mm Note that the diameter of the metal strand 52 may have a value smaller than 0.1 mm such as 0.05 mm. Further, the diameter of the metal strand 52 may have a value larger than 0.2 mm.

The braided member 51 includes a first fixing portion 53 to be fixed and electrically connected to the first terminal 31, a second fixing portion 54 to be fixed and electrically connected to the second terminal 41 and an intermediate portion 55 serving as a part of the braided member 51 between the first and second fixing portions 53, 54.

(First Fixing Portion 53)

The first fixing portion 53 is a part of the braided member 51 to be fixed to the first terminal 31. The first fixing portion 53 is electrically connected to the first terminal 31 by being fixed to the first connecting portion 33. The first fixing portion 53 is, for example, overlapped on the first terminal 31. The first fixing portion 53 is, for example, overlapped on the first connecting portion 33 to overlap in a thickness direction of the first terminal 31. For example, tin plating is applied to each of the first fixing portion 53 and the first connecting portion 33. The first fixing portion 53 is mechanically and electrically connected to the first connecting portion 33 by welding.

(Second Fixing Portion 54)

The second fixing portion 54 is a part of the braided member 51 to be fixed to the second terminal 41. The second fixing portion 54 is electrically connected to the second terminal 41 by being fixed to the second connecting portion 43. The second fixing portion 54 is, for example, overlapped on the second terminal 41. The second fixing portion 54 is, for example, overlapped on the second connecting portion 43 to overlap in a thickness direction of the second terminal 41. For example, tin plating is applied to each of the second fixing portion 54 and the second connecting portion 43. The second fixing portion 54 is mechanically and electrically connected to the second connecting portion 43 by welding.

Note that a method for fixing and electrically connecting the first fixing portion 53 to the first terminal 31 is not limited to welding. For example, if the first terminal 31 includes a crimping piece, the first fixing portion 53 is crimped to or pressed into contact with the first connecting portion 33 by crimping this crimping piece. Also by this, the first fixing portion 53 can be mechanically and electrically connected to the first connecting portion 33. A method for fixing and electrically connecting the second fixing portion 54 to the second terminal 41 is also similarly not limited to welding.

(Intermediate Portion 55)

The braided member 51 is compressed in the intermediate portion 55. That is, the intermediate portion 55 is a compressed part of the braided member 51 between the first and second fixing portions 53, 54. For example, in the intermediate portion 55, the braided member 51 is so compressed that the first and second fixing portions 53, 54 come closer. Each of the plurality of metal strands 52 is, for example, irregularly bent at least in the intermediate portion 55.

Figure 3:
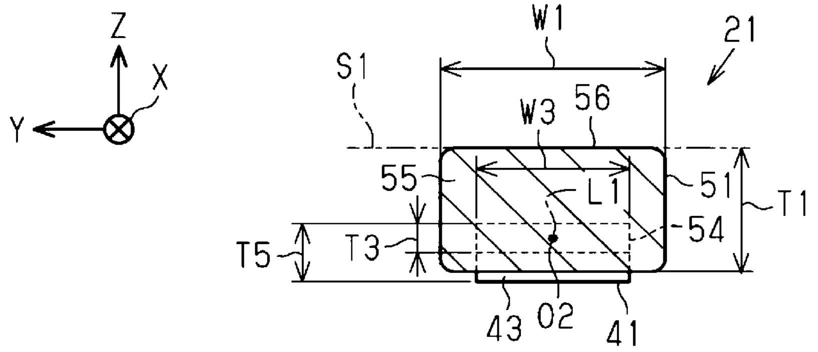
FIG. 3 is a section of the conductive connecting member in the embodiment.

Here, a straight line passing through a center O1 of an end part of the first fixing portion 53 adjacent to the intermediate portion 55 and a center O2 of an end part of the second fixing portion 54 adjacent to the intermediate portion 55 is assumed as a virtual line L1 as shown in FIGS. 1 to 3. Further, an overlapping direction of the first fixing portion 53 and the first terminal 31 when viewed from a direction along the virtual line L1 is assumed as a thickness direction Z. Note that the direction along the virtual line L1 and from the first fixing portion 53 toward the second fixing portion 54 is a longitudinal direction X. The thickness direction Z intersects, for example, perpendicularly to the longitudinal direction X. Further, the thickness direction Z is a direction from the first terminal 31 toward the first fixing portion 53 when the conductive connecting member 21 is viewed in the longitudinal direction X. Further, a direction intersecting perpendicularly to the thickness direction Z and intersecting perpendicularly to the longitudinal direction X is assumed as a width direction Y. The width direction Y is, for example, a direction from the right end to the left end of the conductive connecting member 21 when the thickness direction Z is a direction from down to up in viewing the conductive connecting member 21 in the longitudinal direction X. By the way, FIG. 3 is a section along 3-3 in FIG. 2 and a section when the conductive connecting member 21 is cut along a plane perpendicular to the virtual line L1 in the intermediate portion 55.

For example, each of the plurality of metal strands 52 extends from the first fixing portion 53 to the second fixing portion 54 while being irregularly bent to be inclined with respect to the virtual line L1. Further, for example, the virtual line L1 penetrates through the intermediate portion 55.

As shown in FIGS. 2 and 3, a thickness T1 of the intermediate portion 55 in the thickness direction Z is, for example, larger than a thickness T2 of the first fixing portion 53 in the thickness direction Z and larger than a thickness T3 of the second fixing portion 54 in the thickness direction Z. Further, the thickness T1 may be larger than a thickness T4 of the first fixing portion 53 and the first connecting portion 33 in the thickness direction Z and larger than a thickness T5 of the second fixing portion 54 and the second connecting portion 43 in the thickness direction Z.

As shown in FIGS. 1 and 3, a width W1 of the intermediate portion 55 in the width direction Y is, for example, larger than a width W2 of the first fixing portion 53 in the width direction Y and larger than a width W3 of the second fixing portion 54 in the width direction Y.

As shown in FIG. 3, a cross-sectional shape of the intermediate portion 55 cut along a plane perpendicular to the virtual line L1 is, for example, a polygonal shape. Note that the term "polygonal shape" used in this description may mean a polygonal shape with rounded corners. For example, the cross-sectional shape of the intermediate portion 55 cut along the plane perpendicular to the virtual line L1 is a rectangular shape.

As shown in FIGS. 2 and 3, the outer peripheral surface of the intermediate portion 55 may have a flat surface portion 56 in the form of a flat surface. When the conductive connecting member 21 is viewed in the width direction Y, the flat surface portion 56 is an end surface of the intermediate portion 55 in the thickness direction Z. The flat surface portion 56 extends straight along the longitudinal direction X when the conductive connecting member 21 is viewed in the width direction Y. Further, the flat surface portion 56 extends straight along the width direction Y when the conductive connecting member 21 is viewed in the longitudinal direction X. The flat surface portion 56 extends, for example, along a virtual plane Si perpendicular to the thickness direction Z. The flat surface portion 56 is, for example, located in the virtual plane Si.

The intermediate portion 55 retains its own shape in a natural state where no external force is applied. Further, the intermediate portion 55 is deformed to allow a relative movement of the second terminal 41 with respect to the first terminal 31 when an external force for relatively changing the position of the second terminal 41 with respect to the first terminal 31 is applied to the conductive connecting member 21. For example, if a worker lifts up the conductive connecting member 21 by holding the first terminal 31, a positional relationship of the first and second terminals 31, 41 is maintained constant since the intermediate portion 55 retains its own shape. On the other hand, if an external force for changing the position of the second terminal 41 with respect to the first terminal 31 is applied to the conductive connecting member 21, the metal strands 52 in the intermediate portion 55 are deflected or plastically deformed, whereby the shape of the intermediate portion 55 changes. By this shape change of the intermediate portion 55, the position of the second terminal 41 with respect to the first terminal 31 can be changed.

As shown in FIG. 2, the first terminal 31 is electrically connected to the first connection target 11, for example, by a bolt 13 passed through the first fastening hole 32 and the first connection target 11 and a nut 15 to be fastened to the bolt 13. Further, the second terminal 41 is electrically connected to the second connection target 12, for example, by a bolt 14 passed through the second fastening hole 42 and the second connection target 12 and a nut 16 to be fastened to the bolt 14. In the conductive connecting member 21 connected to the first and second connection targets 11, 12, the intermediate portion 55 retains its own shape when the first and second terminals 31, 41 are respectively connected to the first and second connection targets 11, 12 as long as a new external force is not applied.

(Heat Shrinkable Tube)

As shown in FIGS. 1 and 2, the conductive connecting member 21 may include a heat shrinkable tube 61 for covering the outer periphery of the braided member 51. Note that the heat shrinkable tube 61 is shown by a two-dot chain line in FIGS. 1 and 2. The heat shrinkable tube 61 covers the braided member 51 over the entire periphery. Further, the heat shrinkable tube 61 covers the braided member 51 entirely in the longitudinal direction X.

(Method for Manufacturing Conductive Connecting Member 21)

Next, a method for manufacturing the conductive connecting member 21 is described.

Figure 4:
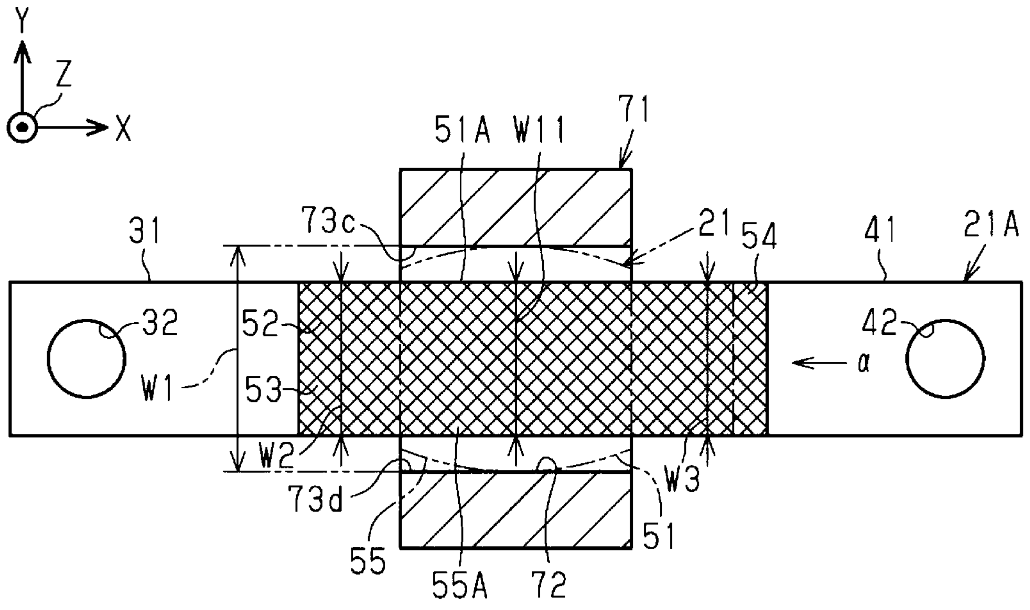
FIG. 4 is a schematic diagram showing a method for manufacturing the conductive connecting member in the embodiment.
Figure 5:
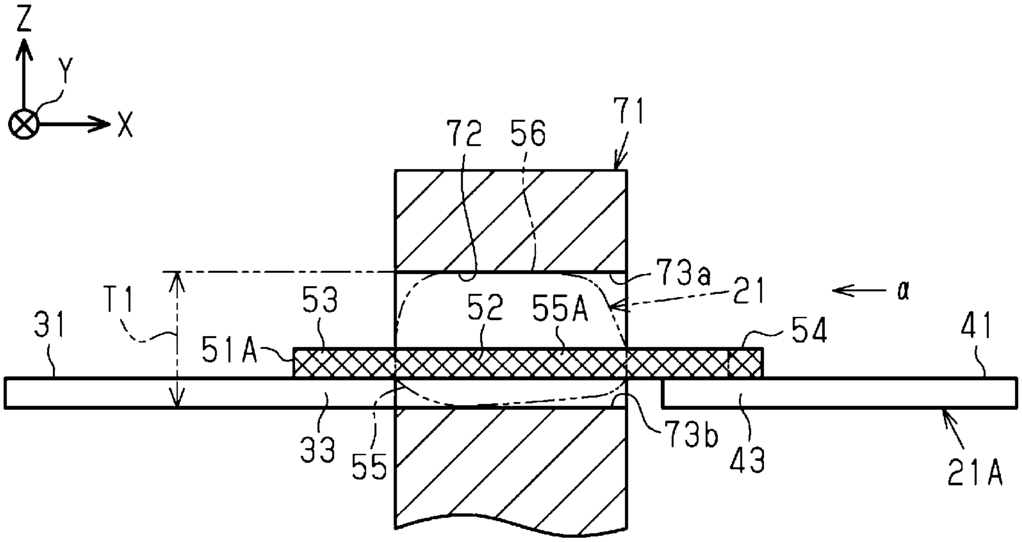
FIG. 5 is a schematic diagram showing the method for manufacturing the conductive connecting member in the embodiment.

A conductive connecting member 21A shown by a solid line in FIGS. 4 and 5 is in a state before the intermediate portion 55 is formed. Note that FIG. 4 is a section along 4-4 in FIG. 6. FIG. 5 is a section along 5-5 in FIG. 6. The conductive connecting member 21A includes the first terminal 31, the second terminal 41 and a braided member 51A. The braided member 51 is a member formed, for example, by braiding the plurality of metal strands 52 into a tube. The braided member 51A is formed into a strip shape by being flatly squeezed from a hollow cylindrical shape. The braided member 51A can, for example, retain its own shape. That is, the shape of the braided member 51A does not change, for example, unless an external force is applied. Note that the braided member 51A may be a flexible member not having a shape retention capability.

The braided member 51A includes the first fixing portion 53, the second fixing portion 54, and a pre-molding intermediate portion 55A serving as a part of the braided member 51A between the first and second fixing portions 53, 54. A width W11 of the pre-molding intermediate portion 55A in the width direction Y is equal to the width W2 of the first fixing portion 53. Further, the width W11 of the pre-molding intermediate portion 55A in the width direction Y is equal to the width W3 of the second fixing portion 54.

Figure 6:
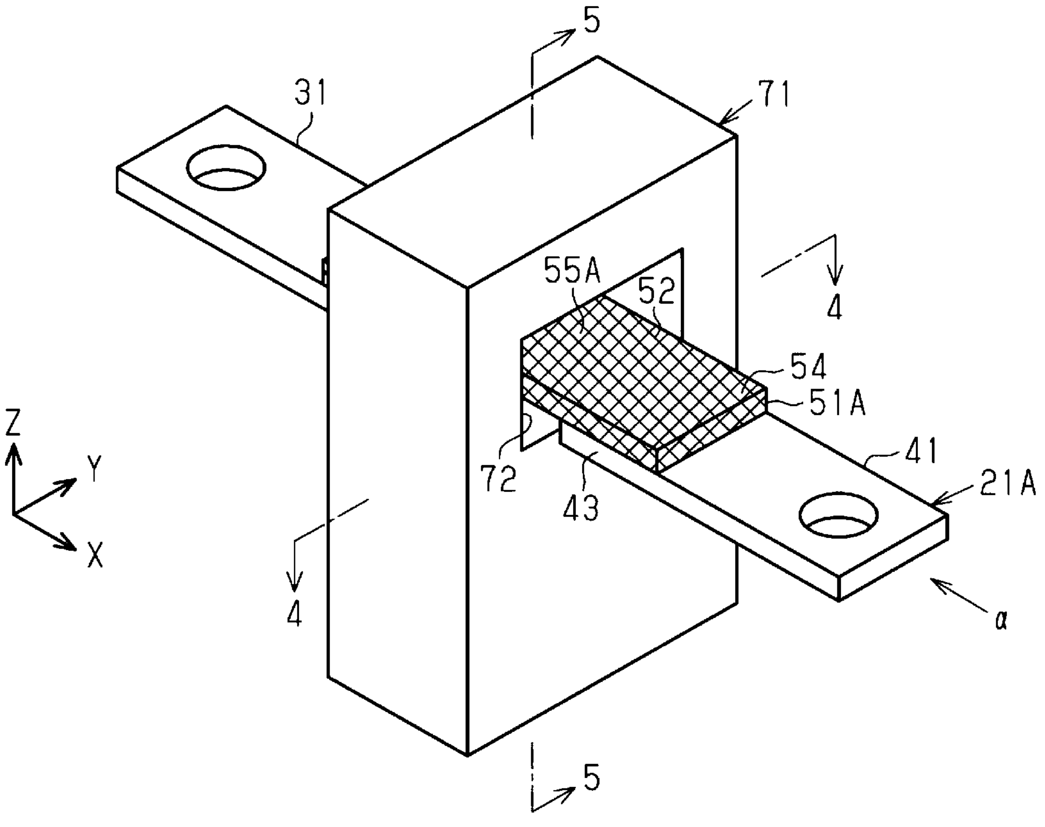
FIG. 6 is a schematic diagram showing the method for manufacturing the conductive connecting member in the embodiment.
Figure 7:
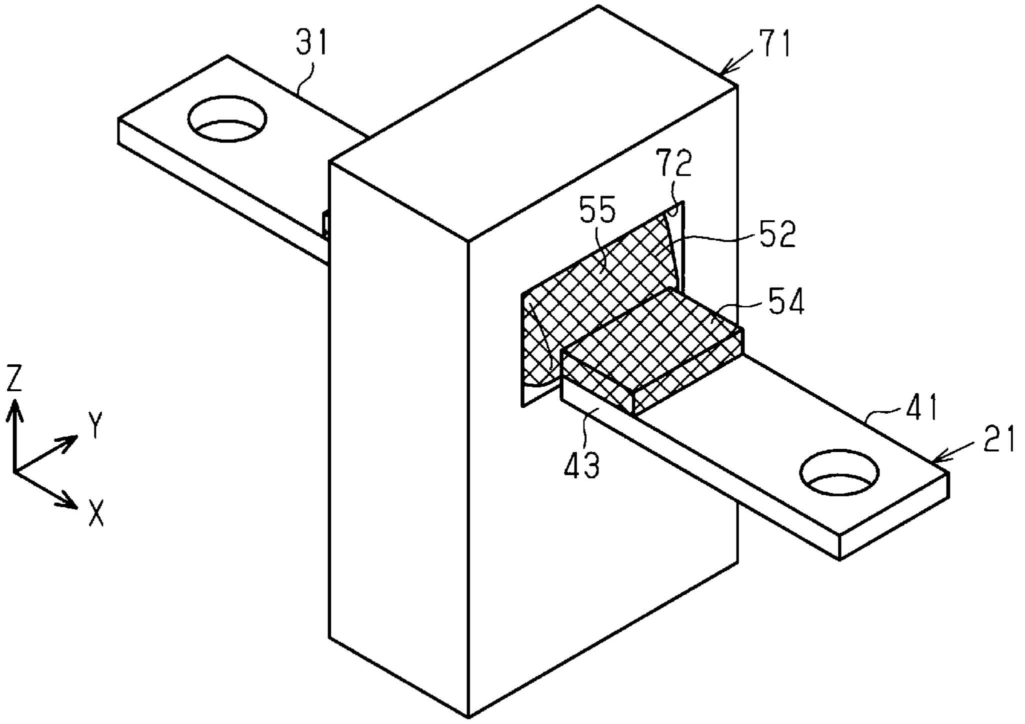
FIG. 7 is a schematic diagram showing the method for manufacturing the conductive connecting member in the embodiment.

As shown in FIGS. 4 to 6, in forming the intermediate portion 55 by molding the pre-molding intermediate portion 55A, a molding tool 71 is, for example, used. The molding tool 71 includes a molding hole 72. The molding hole 72 is a through hole penetrating through the molding tool 71. The molding hole 72 has, for example, a polygonal shape when viewed from a penetration direction of the molding hole 72. The molding hole 72 has, for example, a rectangular shape when viewed from the penetrating direction of the molding hole 72. The inner peripheral surface of the molding hole 72 has four molding surfaces 73*a* to 73*d* each in the form of a flat surface. A distance between the molding surfaces 73*a* and 73*b* facing each other is set equal to the thickness T1 of the intermediate portion 55 to be formed. Further, a distance between the molding surfaces 73*c* and 73*d* facing each other is set equal to the width W1 of the intermediate portion 55 to be formed.

In forming the intermediate portion 55, the conductive connecting member 21A is first arranged through the molding hole 72. At this time, the pre-molding intermediate portion 55A is at least partially arranged in the molding hole 72.

Thereafter, as shown in FIGS. 4 to 7, the second terminal 41 is moved toward the first terminal 31, whereby the pre-molding intermediate portion 55A is pushed into the molding hole 72. At this time, the first terminal 31 is immovably supported by a jig. Note that a pushing direction of the pre-molding intermediate portion 55A into the molding hole 72 is shown by an arrow a in FIGS. 4 to 6. The pre-molding intermediate portion 55A is pushed into the molding hole 72, thereby being compressed and molded into an outer shape corresponding to the inner peripheral surface of the molding hole 72. Thus, the pre-molding intermediate portion 55A is partially pressed against the molding surface 73*a*, whereby the flat surface portion 56 is formed. Further, the metal strands 52 in the pre-molding intermediate portion 55A are irregularly bent by the pre-molding intermediate portion 55A being pushed into the molding hole 72.

The pre-molding intermediate portion 55A becomes the intermediate portion 55 by being pushed into the molding hole 72. That is, the braided member 51A becomes the braided member 51 including the intermediate portion 55 by the pre-molding intermediate portion 55A being pushed into the molding hole 72. Further, the conductive connecting member 21A becomes the conductive connecting member 21 including the braided member 51. FIGS. 4 and 5 show the pushed braided member 51A, i.e. the braided member 51 including the intermediate portion 55 by a two-dot chain line. When the intermediate portion 55 is formed, the conductive connecting member 21 is taken out from the molding tool 71. The intermediate portion 55 retains the shape molded by the molding hole 72 also after being taken out from the molding tool 71. That is, the intermediate portion 55 retains the shape when being taken out from the molding hole 71 as long as an external force is not newly applied.

After the intermediate portion 55 is formed, the heat shrinkable tube 61 before shrinkage is mounted on the braided member 51 to cover the outer periphery of the braided member 51. By thermally treating the heat shrinkable tube 61, the conductive connecting member 21 is completed.

Functions of Embodiment

Functions of the embodiment are described.

Since the braided member 51 is compressed in the intermediate portion 55, the intermediate portion 55 easily retains its own shape in a natural state where no external force is applied. Further, the intermediate portion 55 is easily deformed to allow a relative movement of the second terminal 41 with respect to the first terminal 31 when an external force for relatively changing the position of the second terminal 41 with respect to the first terminal 31 is applied to the conductive connecting member 21.

In the conductive connecting member 21, for example, the second terminal 41 is electrically connected to the second connection target 12 after the first terminal 31 is electrically connected to the first connection target 11. In this case, the position of the second terminal 41 may be shifted with respect to the second connection target 12 due to a dimensional error, an assembling error or the like when the first terminal 31 is electrically connected to the first connection target 11. Since the intermediate portion 55 is formed by partially compressing the braided member 51, the intermediate portion 55 can be easily deformed to allow a relative movement of the second terminal 41 with respect to the first terminal 31 when an external force for relatively changing the position of the second terminal 41 with respect to the first terminal 31 is applied. Therefore, the second terminal 41 can be easily aligned with the second connection target 12 after the first terminal 31 is electrically connected to the first connection target 11.

Further, the intermediate portion 55 retains its own shape in the natural state where no external force is applied. Thus, a relative movement of the intermediate portion 55 with respect to the first and second terminals 31, 41 is suppressed after the first and second terminals 31, 41 are respectively electrically connected to the first and second connection targets 11, 12.

Effects of the embodiment are described.

(1) The conductive connecting member 21 electrically connects the first and second connection targets 11, 12. The conductive connecting member 21 includes the first terminal 31 to be electrically connected to the first connection target 11, the second terminal 41 to be electrically connected to the second connection target 12 and the braided member 51 for electrically connecting the first and second terminals 31, 41. The braided member 51 is a member formed by braiding the plurality of metal strands 52 each other. The braided member 51 includes the first fixing portion 53 to be fixed and electrically connected to the first terminal 31, the second fixing portion 54 to be fixed and electrically connected to the second terminal 41 and the intermediate portion 55 serving as the part of the braided member 51 between the first and second fixing portions 53, 54. The intermediate portion 55 retains its own shape in the natural state where no external force is applied and is deformed to allow a relative movement of the second terminal 41 with respect to the first terminal 31 when an external force for relatively changing the position of the second terminal 41 with respect to the first terminal 31 is applied.

According to this configuration, the intermediate portion 55 retains its own shape in the natural state where no external force is applied. Thus, it is suppressed that the braided member 51 shakes between the first and second terminals 31, 41. Therefore, the interference of the conductive connecting member 21 with surrounding objects can be suppressed.

Further, in connecting the conductive connecting member 22 to the first and second connection targets 11, 12, at least either the first terminal 31 and the first connection target 11 or the second terminal 41 and the second connection target 12 may be shifted in position due to a dimensional error, an assembling error or the like. The intermediate portion 55 is deformed to allow a relative movement of the second terminal 41 with respect to the first terminal 31 when an external force for relatively changing the position of the second terminal 41 with respect to the first terminal 31 is applied to the conductive connecting member 21. Thus, the positions of the first terminal 31 and the first connection target 11 and those of the second terminal 41 and the second connection target 12 can be respectively aligned by deforming the intermediate portion 55. Further, the intermediate portion 55 is easily deformed since being a part of the braided member 51.

(2) Each of the plurality of metal strands 52 is irregularly bent at least in the intermediate portion 55.

According to this configuration, the intermediate portion 55 easily obtains rigidity for retaining its own shape in the natural state where no external force is applied to the conductive connecting member 21. On the other hand, the intermediate portion 55 is easily deformed to allow a relative movement of the second terminal 41 with respect to the first terminal 31 when an external force for relatively changing the position of the second terminal 41 with respect to the first terminal 31 is applied to the conductive connecting member 21. Further, a degree of freedom in a relative moving direction of the second terminal 41 with respect to the first terminal 31 can be increased in the case of changing the relative position of the second terminal 41 with respect to the first terminal 31 by deforming the intermediate portion 55.

For example, if a first terminal and a second terminal are connected by a flexible braided member formed by flatly braiding a plurality of metal strands as before, this braided member hardly allows relative movements of the first and second terminals in a width direction of the braided member. In this case, if a length of the braided member is extended, the first and second terminals are easily allowed to relatively move in the width direction of the braided member. However, if the length of the braided member is extended, there is more concern for the interference of the braided member with surrounding objects.

In contrast, the braided member 51 is compressed in the intermediate portion 55 in the conductive connecting member 21. Thus, the plurality of metal strands 52 are irregularly bent at least in the intermediate portion 55. Accordingly, a volume of the braided member 51 in the intermediate portion 55 is reduced and relative movements of the first and second terminals 31, 41 can be allowed in any direction by the deformation of the intermediate portion 55. As a result, the interference of the braided member 51 with surrounding objects is more suppressed and the first terminal 31 and the first connection target 11, and the second terminal 41 and the second connection target 12 can be more easily aligned.

(3) The first fixing portion 53 is overlapped on the first terminal 31. The straight line passing through the center O1 of the end part of the first fixing portion 53 adjacent to the intermediate portion 55 and the center O2 of the end part of the second fixing portion 54 adjacent to the intermediate portion 55 is assumed as the virtual line L1. The overlapping direction of the first fixing portion 53 and the first terminal 31 when viewed from the direction along the virtual line L1 is assumed as the thickness direction Z. The virtual line L1 penetrates through the intermediate portion 55. The thickness T1 of the intermediate portion 55 in the thickness direction Z is larger than the thickness T2 of the first fixing portion 53 in the thickness direction Z and larger than the thickness T3 of the second fixing portion 54 in the thickness direction Z.

The plurality of metal strands 52 are irregularly bent at least in the intermediate portion 55. Thus, the intermediate portion 55 more easily retains its own shape in the natural state where no external force is applied as compared to the case where the thickness T1 of the intermediate portion 55 is equal to or smaller than the thickness T2 of the first fixing portion 53 and equal to or smaller than the thickness T3 of the second fixing portion 54. Further, as compared to the above case, the intermediate portion 55 is more easily deformed to allow a relative movement of the second terminal 41 with respect to the first terminal 31 when an external force for relatively changing the position of the second terminal 41 with respect to the first terminal 31 is applied to the conductive connecting member 21.

(4) The cross-sectional shape of the intermediate portion 55 cut along the plane perpendicular to the virtual line L1 is a polygonal shape. According to this configuration, since the cross-sectional shape of the intermediate portion 55 cut along the plane perpendicular to the virtual line L1 is a simple polygonal shape, the conductive connecting member 21 can be easily manufactured.

(5) The outer peripheral surface of the intermediate portion 55 includes the flat surface portion 56 in the form of a flat surface. According to this configuration, the flat surface portion 56 has a simple flat surface shape. Thus, the intermediate portion 55 including the flat surface portion 56 on the outer peripheral surface can be easily manufactured.

(6) The plurality of metal strands 52 are braided into a tube. According to this configuration, the thickness T1 of the intermediate portion 55 can be easily increased as compared to the case where the metal strands 52 are flatly braided.

(7) The first terminal 31 includes the first fastening hole 32 into which the bolt 13 for electrically connecting the first terminal 31 to the first connection target 11 is insertable. The second terminal 41 includes the second fastening hole 42 into which the bolt 14 for electrically connecting the second terminal 41 to the second connection target 12 is insertable.

According to this configuration, the conductive connecting member 21 can be easily electrically connected to the first and second connection targets 11, 12 with the bolts 13, 14, using the first and second fastening holes 32, 42. Further, if the first terminal 31 is electrically connected to the first connection target 11 with the bolt 13, it can be suppressed that the electrical connection of the first terminal 31 and the first connection target 11 becomes unstable. Similarly, if the second terminal 41 is electrically connected to the second connection target 12 with the bolt 14, it can be suppressed that the electrical connection of the second terminal 41 and the second connection target 12 becomes unstable.

(8) The conductive connecting member 21 further includes the heat shrinkable tube 61 for covering the outer periphery of the braided member 51. According to this configuration, the braided member 51 can be protected by the heat shrinkable tube 61. Further, distances between the braided member 51 and surrounding objects can be further reduced with the conductive connecting member 21 connected to the first and second connection targets 11, 12.

(9) The width W1 of the intermediate portion 55 is larger than the width W2 of the first fixing portion 53 and larger than the width W3 of the second fixing portion 54.

According to this configuration, the intermediate portion 55 more easily retains its own shape in the natural state where no external force is applied as compared to the case where the width W1 of the intermediate portion 55 is equal to or smaller than the width W2 of the first fixing portion 53 and equal to or smaller than the width W3 of the second fixing portion 54. Further, as compared to the above case, the intermediate portion 55 is more easily deformed to allow a relative movement of the second terminal 41 with respect to the first terminal 31 when an external force for relatively changing the position of the second terminal 41 with respect to the first terminal 31 is applied to the conductive connecting member 21.

Further, in the conductive connecting member 21, the thickness T1 of the intermediate portion 55 is larger than the thickness T2 of the first fixing portion 53 and larger than the thickness T3 of the second fixing portion 54. Thus, a degree of freedom in the relative moving direction of the second terminal 41 with respect to the first terminal 31 can be increased in the case of changing the relative position of the second terminal 41 with respect to the first terminal 31 by deforming the intermediate portion 55.

(10) The thickness T1 of the intermediate portion 55 is larger than the thickness T4 of the first fixing portion 53 and the first connecting portion 33 and larger than the thickness T5 of the second fixing portion 54 of the second connecting portion 43.

According to this configuration, the intermediate portion 55 more easily retains its own shape in the natural state where no external force is applied as compared to the case where the thickness T1 of the intermediate portion 55 is equal to or smaller than the thickness T4 and equal to or smaller than the thickness T5. Further, as compared to the above case, the intermediate portion 55 is more easily deformed to allow a relative movement of the second terminal 41 with respect to the first terminal 31 when an external force for relatively changing the position of the second terminal 41 with respect to the first terminal 31 is applied to the conductive connecting member 21.

This embodiment can be modified and carried out as follows. This embodiment and the following modifications can be carried out in combination without technically contradicting each other.

- The conductive connecting member 21 may not include the heat shrinkable tube 61.
- The first terminal 31 may not include the first fastening hole 32. The first terminal 31 is electrically connected to the first connection target 11 by any one of methods such as welding, insulation displacement, crimping and connection via a connector when not including the first fastening hole 32. Similarly, the second terminal 41 also may not include the second fastening hole 42. The second terminal 41 is electrically connected to the second connection target 12 by any one of methods such as welding, insulation displacement, crimping and connection via a connector when not including the second fastening hole 42.
- The plurality of metal strands 52 constituting the braided member 51 may be flatly braided.
- The outer peripheral surface of the intermediate portion 55 may not include the flat surface portion 56 in the form of a flat surface. For example, if the intermediate portion 55 has a cylindrical shape extending along the virtual line L1, the outer peripheral surface of the intermediate portion 55 has a hollow cylindrical shape.
- The cross-sectional shape of the intermediate portion 55 cut along the plane perpendicular to the virtual line L1 is not limited to a polygonal shape. The cross-sectional shape of the intermediate portion 55 cut along the plane perpendicular to the virtual line L1 may be, for example, any one of a circular shape, an elliptical shape, a race track shape and other arbitrary shapes.
- Each of the plurality of metal strands 52 may be regularly bent.
- The virtual line L1 may not penetrate through the intermediate portion 55.
- In the above embodiment, the thickness T1 of the intermediate portion 55 is larger than the thickness T2 of the first fixing portion 53 and larger than the thickness T3 of the second fixing portion 54. However, the thickness T1 of the intermediate portion 55 may be equal to or smaller than the thickness T4 of the first fixing portion 53 and the first connecting portion 33 and, further, equal to or smaller than the thickness T2 of the first fixing portion 53. Further, the thickness T1 of the intermediate portion 55 may be equal to or smaller than the thickness T5 of the second fixing portion 54 and the second connecting portion 43 and, further, equal to or smaller than the thickness T3 of the second fixing portion 54. In this case, the width W1 of the intermediate portion 55 in the width direction Y is preferably larger than the width W2 of the first fixing portion 53 and larger than the width W3 of the second fixing portion 54.
- In the above embodiment, the conductive connecting member 21 is provided in the wheel driving motor serving as a power source for the travel of the vehicle such as an electric or hybrid vehicle. However, the conductive connecting member 21 may be provided in a device other than this motor. For example, the conductive connecting member 21 may be arranged inside a case of an inverter installed in an electric or hybrid vehicle. Further, the conductive connecting member 21 may be, for example, arranged inside an electrical connection box installed in a vehicle such as an automotive vehicle. Further, the conductive connecting member 21 may be, for example, used to connect electric devices installed in a vehicle such as an automotive vehicle.

A technical concept which can be grasped from the above embodiment and modifications is described.

(A) A conductive connecting member for electrically connecting a first connection target and a second connection target includes a first terminal to be electrically connected to the first connection target, a second terminal to be electrically connected to the second connection target and a braided member for electrically connecting the first and second terminals, wherein the braided member is a member formed by braiding a plurality of metal strands each other and includes a first fixing portion to be fixed and electrically connected to the first terminal, a second fixing portion to be fixed and electrically connected to the second terminal and an intermediate portion serving as a part of the braided member between the first and second fixing portions, and the braided member is compressed in the intermediate portion.

According to this configuration, since the braided member is compressed in the intermediate portion, the intermediate portion easily retains its own shape in a natural state where no external force is applied. Thus, it is suppressed that the braided member shakes between the first and second terminals. Therefore, the interference of the conductive connecting member with surrounding objects can be suppressed.

Further, in connecting the conductive connecting member to the first and second connection targets, at least either the first terminal and the first connection target or the second terminal and the second connection target may be shifted in position due to a dimensional error, an assembling error or the like. Since the braided member is compressed in the intermediate portion, the intermediate portion is easily deformed to allow a relative movement of the second terminal with respect to the first terminal when an external force for relatively changing the position of the second terminal with respect to the first terminal is applied to the conductive connecting member. Thus, the positions of the first terminal and the first connection target and those of the second terminal and the second connection target can be respectively aligned by deforming the intermediate portion.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A conductive connector for electrically connecting a first connection target and a second connection target, comprising:

a first terminal to be electrically connected to the first connection target;

a second terminal to be electrically connected to the second connection target; and a braided portion for electrically connecting the first and second terminals, wherein:

the braided portion is a member formed by braiding a plurality of metal stands each other and includes a first fixing portion to be fixed and electrically connected to the first terminal, a second fixing portion to be fixed and electrically connected to the second terminal and an intermediate portion serving as a part of the braided portion between the first and second fixing portions, the first fixing portion is overlapped on the first terminal, if a straight line passing through a center of an end part of the first fixing portion adjacent to the intermediate portion and a center of an end part of the second fixing portion adjacent to the intermediate portion is assumed as a virtual line and an overlapping direction of the first fixing portion and the first terminal when viewed from a direction along the virtual line is assumed as a thickness direction, the virtual line penetrates through entirety of the intermediate portion in the intermediate portion, a thickness of the intermediate portion in the thickness direction is larger than a thickness of the first fixing portion in the thickness direction and larger than a thickness of the second fixing portion in the thickness direction, and the intermediate portion has a rigidity such that the intermediate portion retains an own shape in a natural state where no external force is applied and when the first fixing portion is lifted up with the second fixing portion floating in the air, a positional relationship of the first fixing portion and the second fixing portion is maintained constant, and the intermediate portion is deformed to allow a relative movement of the second terminal with respect to the first terminal when an external force for relatively changing a position of the second terminal with respect to the first terminal is applied.

2. The conductive connector of claim 1, wherein each of the plurality of metal strands is bent to be inclined with respect to the virtual line at least in the intermediate portion.

3. The conductive connector of claim 2, wherein:

a cross-sectional shape of the intermediate portion cut along a plane perpendicular to the virtual line is a polygonal shape.

4. The conductive connector of claim 2, wherein an outer peripheral surface of the intermediate portion includes a flat surface portion in the form of a flat surface.

5. The conductive connector of claim 1, wherein the plurality of metal strands are braided into a tube.

6. The conductive connector of claim 1, wherein:

the first terminal includes a first fastening hole into which a bolt for electrically connecting the first terminal to the first connection target is insertable, and the second terminal includes a second fastening hole into which a bolt for electrically connecting the second terminal to the second connection target is insertable.

7. The conductive connector of claim 1, wherein in the natural state where no external force is applied, the thickness of the intermediate portion in the thickness direction is larger than a total thickness of the first fixing portion and the first terminal in the thickness direction and larger than a total thickness of the second fixing portion and the second terminal in the thickness direction.

8. The conductive connector of claim 1, wherein an entire portion of the intermediate portion has an upper surface higher than the virtual line and a lower surface lower than the virtual line.

9. The conductive connector of claim 1, further comprising a heat shrinkage tube for covering an outer periphery of the braided portion.

10. The conductive connector of claim 9, wherein the heat shrinkage tube covers an entire portion of the first fixing portion and the second fixing portion and a portion of the first terminal and the second terminal.

* * * * *